United States Patent [19]

Müller

[11] Patent Number: 4,610,359

[45] Date of Patent: Sep. 9, 1986

[54] METHOD FOR RECOGNIZING AND SORTING ARTICLES

[75] Inventor: Ernst-August Müller, Hamburg, Fed. Rep. of Germany

[73] Assignee: Licentia Patent-Verwaltungs-GmbH, Frankfurt am Main, Fed. Rep. of Germany

[21] Appl. No.: 582,444

[22] Filed: Feb. 22, 1984

[30] Foreign Application Priority Data

Feb. 23, 1983 [DE] Fed. Rep. of Germany ....... 3306175

[51] Int. Cl.⁴ .............................................. B07C 5/02
[52] U.S. Cl. .................................... 209/3.1; 198/372;
209/557; 209/576; 209/653; 209/939; 235/385;
235/475; 364/478
[58] Field of Search ............... 209/569, 583, 656, 657,
209/653, 555, 576, 587, 939, 552, 3.1, 586, 557;
198/370, 372, 367, 699; 235/385, 476, 477;
364/478, 466; 235/475, 482; 356/394

[56] References Cited

U.S. PATENT DOCUMENTS

| | | | |
|---|---|---|---|
| 3,373,623 | 3/1968 | Gutting | 198/502 |
| 3,411,622 | 11/1968 | Dickie | 209/656 |
| 3,512,637 | 5/1970 | Littlefield | 209/583 |
| 3,645,391 | 2/1972 | Hirakawa et al. | 209/583 |
| 3,738,475 | 6/1973 | Lee et al. | 198/350 |
| 3,802,548 | 4/1974 | Wentz et al. | 198/502 |
| 3,814,521 | 6/1974 | Free | 356/394 |
| 4,010,354 | 3/1977 | Apicella, Jr. et al. | 235/385 |
| 4,175,694 | 11/1979 | Donabin | 235/476 |
| 4,176,260 | 11/1979 | Ward et al. | 198/699 |

FOREIGN PATENT DOCUMENTS

| | | | |
|---|---|---|---|
| 899174 | 12/1953 | Fed. Rep. of Germany . | |
| 1456753 | 3/1969 | Fed. Rep. of Germany . | |
| 3239938 | 5/1984 | Fed. Rep. of Germany | 209/587 |
| 473996 | 10/1937 | United Kingdom . | |
| 2046428 | 11/1980 | United Kingdom | 209/587 |

OTHER PUBLICATIONS

"Solid State Image Sensor Arrays", EG&G Reticon, Sunnyvale, Calif.—1977.
"Phoenix Platform Sorting Unit", Promech, Holland.

Primary Examiner—Robert B. Reeves
Assistant Examiner—Donald T. Hajec
Attorney, Agent, or Firm—Spencer & Frank

[57] ABSTRACT

A method and apparatus for recognizing and sorting articles. The apparatus includes at least one reading station having an optoelectronic sensor for forming an image pattern of each article, an evaluation device connected to the optoelectronic sensor and a transporting device which transports the articles underneath the optoelectronic sensor. The transporting device includes an endless transporting belt having a conveying surface with transversely disposed ribs for subdividing the surface into a plurality of sections. The method includes generating input signals representing predetermined data associated with each article before the respective article is placed onto the transporting device; feeding the input signals to the evaluation device; placing each article onto the belt into a respective, pre-assigned section; transporting each article past the optoelectronic sensor in an aligned position relative to the optoelectronic sensor and with the conveying surface of the belt forming an oblique angle with a horizontal plane, the angle opening in a direction normal to the longitudinal dimension of the conveying surface; producing image data with the use of the optoelectronic sensor for each article as it is transported past such sensor; feeding the image data to the evaluation device; and automatically removing the articles from the respective belt sections according to predetermined sorting criteria at at least one separation station which is controlled by the evaluation device.

8 Claims, 2 Drawing Figures

METHOD FOR RECOGNIZING AND SORTING ARTICLES

BACKGROUND OF THE INVENTION

The present invention relates to a method for recognizing and sorting articles, such as newspapers, magazines, books, cartons, or boxes with the use of a reading station including an optoelectronic sensor, an evaluation device connected to the sensor and a transporting device which transports the articles underneath the sensor.

Such a method is disclosed in German Patent Application No. P 32 39 938.3 wherein an optoelectronic sensor is used to furnish a rough, limited resolution image of an article. The rough image of the article is compared with a given reference image in an evaluation device which produces a signal which is a measure of the coincidence between the rough image and the given reference image.

In the method disclosed in the above cited German Patent application, the articles are transported on a conveyor belt past an optoelectronic sensor at a speed of approximately 1 meter/second, with the conveyor belt comprising, for example, a plurality of juxtaposed conveyor rollers. This produces a number of problems which come to bear particularly in connection with articles such as newspapers and magazines. One such problem is, for example, magazine flutter which is particularly distinct at the relatively high transporting speeds required to realize a high throughput. Moreover, the articles may lie partially or completely on top on one another and may be transported without being aligned. Additionally, during sorting, i.e. singling out individual articles, impediments may develop due to back-up accumulation.

SUMMARY OF THE INVENTION

It is therefore an object of the present invention to provide a method of the above type, and an apparatus for implementing the method, with which it is possible to realize a high throughput of articles, perfect sorting of the articles and the simultaneous processing of a plurality of orders for the articles.

The above and other objects are accomplished according to the invention by the provision of a method for recognizing and sorting articles, each of which have predetermined data, such as ordering data, associated therewith. The method employs at least one reading station including an optoelectronic sensor for forming an image pattern of each article, an evaluation device connected to the optoelectronic sensor and a transporting device which transports the articles underneath the optoelectronic sensor. The transporting device includes an endless transporting belt having a conveying surface with a longitudinal dimension and ribs disposed across the conveying surface transversely to its longitudinal dimension for subdividing the conveying surface into a plurality of sections. The method includes generating input signals representing the predetermined data associated with each article before the respective article is placed onto the transporting device; feeding the input signals for each respective article to the evaluation device; placing each article onto the belt into a respective, pre-assigned section; transporting each article past the optoelectronic sensor in an aligned position relative to the optoelectronic sensor and with the conveying surface of the belt forming an oblique angle with a horizontal plane, the angle opening in a direction normal to the longitudinal dimension of the conveying surface; producing image data with the use of the optoelectronic sensor containing recognition information for each article as it is transported past such sensor; feeding the image data to the evaluation device; and automatically removing the articles from the respective belt sections according to predetermined sorting criteria at at least one separation station which is controlled by the evaluation device.

Apparatus according to the invention for implementing the novel method of the invention includes a transporting device for transporting the articles. The transporting device includes an endless belt having a conveying surface with longitudinal sides. The conveying surface is arranged to form an oblique angle with a horizontal plane, so that one longitudinal side is lower than the other. A reading station including an optoelectronic device is positioned above the belt for generating image data containing recognition information relating to an article which is transported past the reading station. An insertion station is located adjacent to the transporting device and upstream from the reading station. The articles are placed on the conveying surface at the insertion station. The insertion station includes input means for producing input signals corresponding to the predetermined data associated with an article. At least one separation station is located downstream of the reading station and includes separation means for automatically removing the articles from the belt. An evaluation means has inputs connected to the input means for receiving the predetermined data and to the optoelectronic device for receiving the image data and an output connected to the separation means for controlling the removal of the articles from the belt. An abutment edge is located adjacent the lower of the longitudinal sides. The oblique angle of the conveying surface is sufficiently large to cause each article to slidingly align itself against the abutment edge thus presenting a mechanical barrier relative to the sliding movement of the article.

One advantage of the present invention is the expandability of the method, and of the apparatus for implementing the method, by increasing the number of separation stations. The sections of the endless transporting device are optimally utilized in an advantageous manner.

DESCRIPTION OF THE PREFERRED EMBODIMENT

Figure 1:
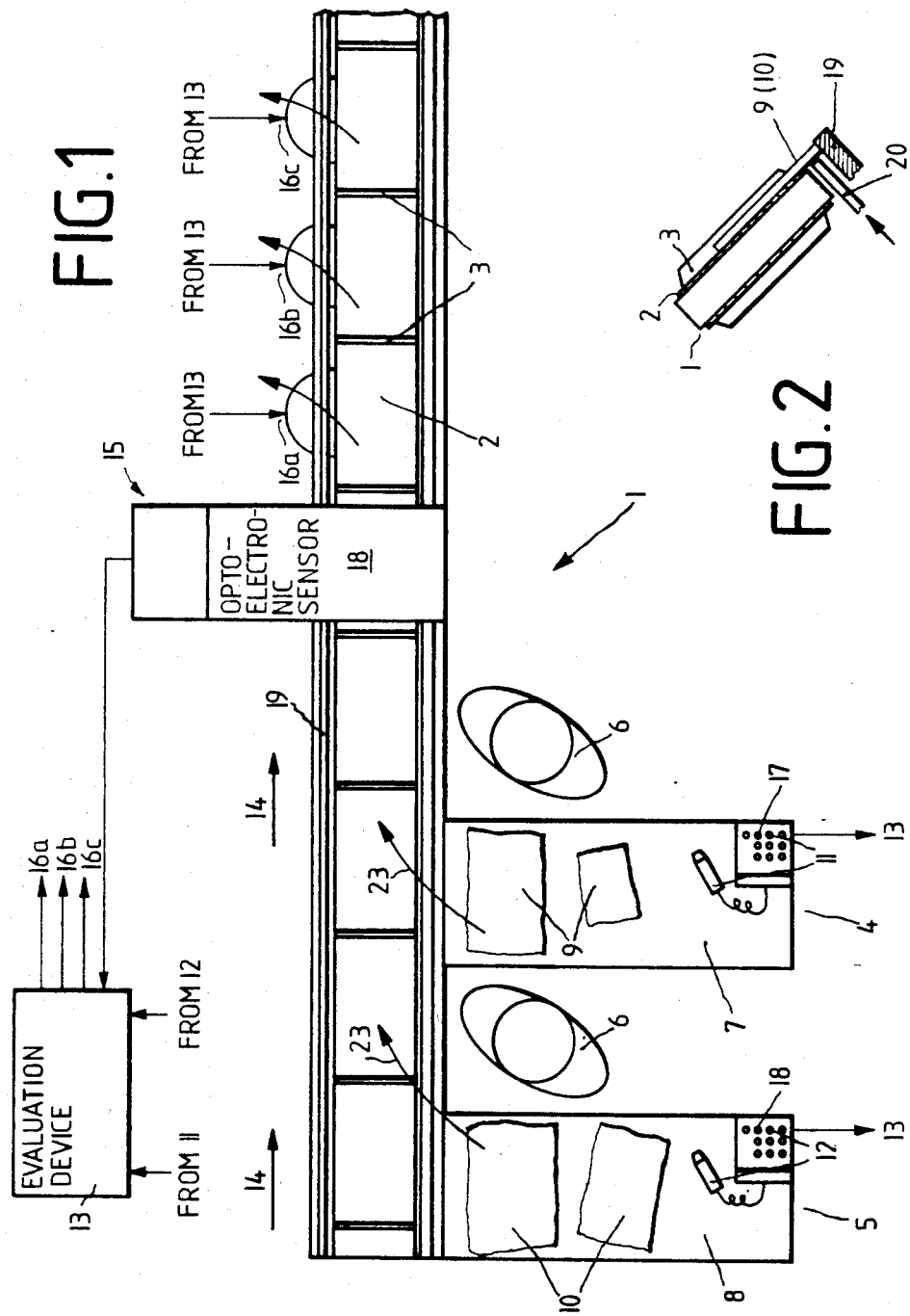
FIG. 1 is a schematic of a plan view of the apparatus according to the invention for implementing the method of the invention.

Referring to FIG. 1, an endless transporting device 1 includes a belt conveyor whose transporting belt 2 is divided into sections by transverse ribs 3 and is provided with one, two or more insertion stations, two such stations 4 and 5 being illustrated in FIG. 1. These insertion stations may be operated manually, i.e., with the aid of human operators 6 who place the articles onto transporting belt 2.

Insertion stations 4 and 5 include respective tables 7 and 8, each of which serves as a depository for the respective articles 9 and 10 to be identified, and respective input devices 11 and 12 for the determination of the origin of the respective order for the article. Input devices 11 and 12 at insertion stations 4 and 5, respectively, each include an input keyboard and/or a bar code reader and are connected to an evaluation device 13. After the articles 9 and 10 have been identified as to their origin, inserters 6 remove the articles in sequence from tables 7 and 8 and insert them, according to the arrows 23, in one of the sections of conveyor belt 2 moving past inserters 6 in the direction of arrow 14. The sections are identified, for example by numbers or colors markers, and each inserter 6 is instructed to fill a certain type of identified section.

Above the endless transporting device 1, and downstream of insertion stations 4 and 5, there is disposed a reading station 15. Reading station 15 includes an optoelectronic sensor 18, which may operate according to the principle of gray value recognition, with the actual image pattern of an article 9 or 10 being compared with memorized reference patterns. Reading station 15 furnishes recognition and identification results of the articles to evaluation device 13.

Reading station 15 is followed downstream by a number of separation stations of which three such stations 16a, 16b and 16c are shown. The separation stations 16a, 16b and 16c are each controlled by a respective output from evaluation device 13 in dependence on the reading results furnished by reading station 15, the origin data furnished by input devices 11 and 12 and predetermined sorting criteria.

The device shown in FIG. 1 recognizes, identifies and sorts the articles in the following manner:

Before placement of the articles 9 and 10, respectively, by inserters 6 on conveyor belt 2 of endless transporting device 1, input devices 11 and 12 are used to generate signals representing the origin data of each of the articles 9 and 10 and this information is fed, for example via keyboards 17 and 18, respectively, to evaluation device 13. Thereafter, inserters 6 separate articles 9 and 10 by placing the articles into an identified, or pre-assigned section of endless transporting device 1. In their assigned sections, articles 9 and 10 are brought into an aligned, oblique position (explained below) in which they pass underneath the electronic sensor of reading station 15. In reading station 15, articles 9 and 10, respectively, are recognized and identified, with the results obtained thereby being transmitted to evaluation device 13. Finally, in separation stations 16, articles 9 and 10, respectively, are automatically removed from the sections according to set sorting criteria.

Figure 2:
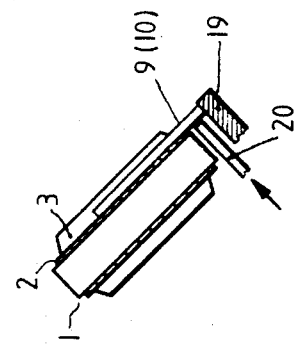
FIG. 2 is an end sectional view of the conveyor belt shown in FIG. 1.

The partial view of FIG. 2 shows a conveyor belt 2 for receiving articles 9 and 10, respectively, with belt 2 being arranged on endless transporting device 1 at an oblique orientation relative to a horizontal plane so that articles 9 (or 10) disposed in the respective sections separated by transverse ribs 3 are automatically aligned by the force of gravity at an abutment edge 19. Abutment edge 19 may be, for example, in the form of a slide rail or roller track. In a given separation station 16, abutment edge 19 cooperates with an actuation device 20 so that, upon activation of actuation device 20, the article is pushed beyond the abutment edge 19 and, due to its own gravity, automatically falls out of the section. The actuation device 20 can be, for example, an electromechanical device having little mass, which can be operated (i.e. moved back and forth) very quickly.

Transverse ribs 3 are preferably in the form of vertical walls which are perpendicular to the transporting direction of endless transporting device 1. These walls prevent the above described magazine fluttering even at high transporting speeds.

The apparatus for implementing the method may be multiplied in an advantageous manner by providing two or more juxtaposed endless transporting devices 1, since the separating stations of parallel devices can act on common targets, for example, collecting containers or other conveyor belts for removing the separated articles.

The reading station 15 includes an optoelectronic sensor 18 for example described in the publication of EG & G Reticon Corporation, 345 Potrero Avenue, Sunnyvale, Ca. 94086 entitled "Solid State Image Sensor Arrays RA-50X50A, RA-32X32A, which can be built up with a solid state image sensor array, consisting for instance of 1024 silicon photodiodes in a $32 \times 32$ matrix, onto which the image of the article transported underneath the reading station is projected by means of an optical lens. The self scanned sensor array can be operated with a high frame rate, i.e. 1000 Hz, in order to obtain a sharp image even when the articles are transported with high speed, i.e. 1 m/s.

The evaluation device 13 mainly consists of a number of memories in which the image patterns generated from articles during a learning mode are stored, and a comparator in which during the reading mode an actual image pattern is compared with all stored patterns. An article is described both by its image pattern, an item number and a sorting address. The item numbers and sorting addresses are stored also in the evaluation device. When an actual image pattern is recognized by best coincidence with one out of all stored pattern, the associated item number and sorting address are recalled. The sorting address is converted to a control signal, which operates the associated separation station 16. The item number is stored in a separate memory as a reading result. The reading results are listed in that memory according to origin numbers.

The sources of articles to be recognized and sorted are described by origin numbers. Previous to handling of articles from a new source the origin number is sent to the evaluation device 13 by means of the input devices 11 or 12 or keyboards 17 and 18. From now all articles sent from insertion station 4 or 5 respectively are listed under the associated origin number until the origin number is changed when the next source occurs.

The evalution device 13 can be operated in the learning or reading mode. In the learning mode an article to be learnt is read by the reading station 15 which generates an image pattern. In time the specific item number and sorting address of the article are transferred to the evaluation device 13 by means of a terminal belonging to the evaluation device 13. Both the image pattern, item number and sorting address are stored in memories within the evaluation device 13.

It will be understood that the above description of the present invention is susceptible to various modifications, changes and adaptations, and the same are intended to be comprehended within the meaning and range of equivalents of the appended claims.

What is claimed is:

1. Method for recognizing and sorting articles, each article having predetermined data associated therewith corresponding to the source of the article, the method being carried out with the use of at least one reading station including an optoelectronic sensor for forming an image pattern of each article, an evaluation device connected to the optoelectronic sensor and storing respective predetermined sorting criteria corresponding to respective ones of the image patterns to be formed by the optoelectronic sensor, a transporting device which transports the articles underneath the optoelectronic sensor, the transporting device including an endless transporting belt having a conveying surface with a longitudinal dimension and ribs disposed across the conveying surface transversely to its longitudinal dimension for subdividing the conveying surface into a plurality of sections, and a plurality of insertion stations located adjacent the transporting device upstream of the reading station from which articles are placed onto the transporting device, comprising:

generating input signals representing the predetermined data associated with each article before the respective article is placed onto the transporting device;

feeding the input signals for each respective article to the evaluation device;

placing each article from a respective one of the insertion stations onto the belt into a respective, preassigned belt section associated with said respective one of the insertion stations;

transporting each article past the optoelectronic sensor in an aligned position relative to the optoelectronic sensor and with the conveying surface of the belt forming an oblique angle with a horizontal plane, the angle opening in a direction normal to the longitudinal dimension of the conveying surface;

producing image data, with the use of the optoelectronic sensor, representing the image pattern for each respective article as it is transported past such sensor;

feeding the image data to the evaluation device;

processing the image data for each article in the evaluation device to associate the corresponding sorting criteria with the respective article and to record the source of that article; and automatically removing each article from its preassigned belt section at a separation station selected by the sorting criteria associated with that article.

2. Method as defined in claim 1, wherein said generating step is performed at a respective one of the insertion stations.

3. Method as defined in claim 1, wherein the respective belt sections are marked so as to relate each belt section with a respective one of the insertion stations, and said placing step includes placing each article into a section bearing a marking corresponding to the respective insertion station from which the article was placed onto the belt.

4. Apparatus for identifying and sorting articles each of which has predetermined data associated therewith which identifies the source of the article, comprising:

a transporting device for transporting the articles, said transporting device including an endless belt having a conveying surface and longitudinal sides, said surface being arranged to form an oblique angle with a horizontal plane so that one longitudinal side is lower than the other longitudinal side;

a reading station including an optoelectronic device positioned above said belt for generating image data representing an image pattern of an article which is transported past said reading station;

a plurality insertion stations located adjacent to said transporting device and upstream from said reading station, each said section of the belt bearing a marking corresponding to a respective one of the insertion stations, the articles from each insertion station being placed onto a section of said belt bearing a marking corresponding with that insertion station, and each said insertion station including input means for producing input signals corresponding to the predetermined data associated with an article;

a plurality of separation stations located downstream of said reading station each including separation means for automatically removing the articles from said belt;

an evaluation means for storing respective predetermined sorting criteria corrresponding with respective ones of the image patterns generated by said reading station, said evaluation means having inputs connected to said input means for receiving the predetermined data and to said optoelectronic device for receiving the image data and output means connected to said separation stations, said evaluation means processing the image data for each article to associate the respective sorting criteria with such article and to record the source of such article, said evaluation means producing at a signal at said output means corresponding to the sorting criteria associated with such article for controlling a selected one of the separation stations to remove such article from the belt; and an abutment edge located adjacent the lower of said longitudinal sides;

wherein the oblique angle of said conveying surface is sufficiently large to cause each article to slidingly align itself against said abutment edge by the force of gravity, said abutment edge thus presenting a mechanical barrier relative to the sliding movement of the article.

5. Apparatus as defined in claim 4, wherein said abutment edge comprises a slide rail.

6. Apparatus as defined in claim 4, wherein said separation means includes actuation means for selectively allowing the article transported by a given section to overcome the mechanical barrier presented by said abutment edge and to automatically drop out of said section by the force of gravity.

7. Apparatus as defined in claim 6, wherein said actuation means includes a light weight electromechanical actuation device.

8. Apparatus as defined in claim 7, wherein said transverse ribs each comprise a vertically oriented wall.

* * * * *